Sept. 8, 1925.
H. F. SECRETAN
ELECTRIC PLUG AND SOCKET CONNECTION
Filed April 16, 1925
1,553,191
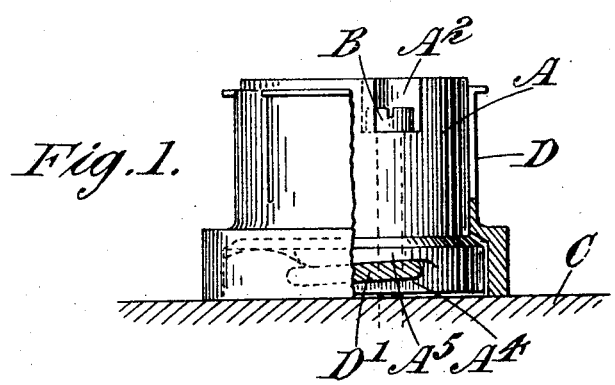
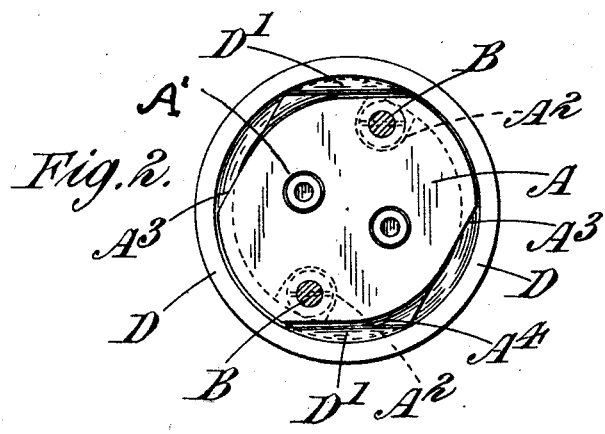
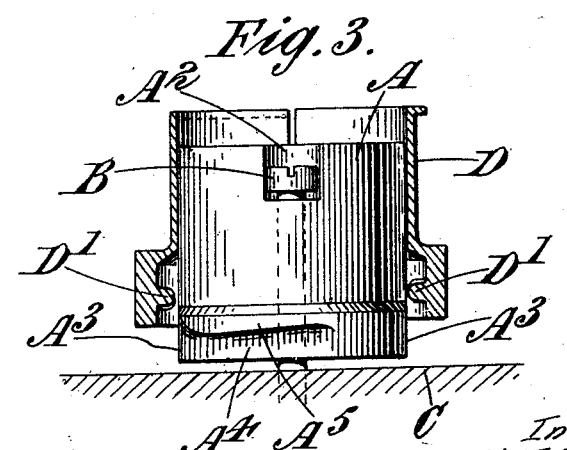

Patented Sept. 8, 1925.

1,553,191

UNITED STATES PATENT OFFICE.

HAROLD FREDERIC SECRETAN, OF PELAW-ON-TYNE, ENGLAND.

ELECTRIC PLUG AND SOCKET CONNECTION.

Application filed April 16, 1925. Serial No. 23,696.

*To all whom it may concern:*

Be it known that I, HAROLD FREDERIC SECRETAN, a subject of the King of England, and residing at Pelaw-on-Tyne, in the county of Durham, England, have invented certain new and useful Improvements in Electric Plug and Socket Connections, of which the following is a specification.

This invention relates to electric plug and socket connections and has particular reference to wall or like plugs of the type in which the moulded socket portion is provided with a metal sleeve or ring and the plug portion furnished with a metal cap or cover which is earthed so that when in use the whole connector is enclosed in an earthed metal casing.

The present invention is concerned particularly with the metal sleeve or ring above mentioned and the method of securing it to the socket portion which it surrounds.

According to this invention the metal sleeve or ring is made so that it can be slipped or pushed over the socket portion and then turned into locking engagement therewith. This facilitates the wiring of the socket portion as the electrical connections can be made with the metal ring removed and when the wiring has been completed which can be done with a minimum amount of slack in the wires, the metal ring can be placed in position. This construction is particularly advantageous when the improved plug and socket connector is to be substituted for a switch or other fitting already wired up where the wire or cable ends are short.

The invention can be carried out in various ways for instance by providing any convenient form of bayonet joint between the ring and the socket. Preferably, however, two flats are provided at opposite sides of the bottom part of the moulded socket, this part being of slightly larger diameter than the main or upper portion. The metal ring is provided with two internal projections or ridges which slip over the flats as the ring is pushed into position. Leading from each flat in the moulded socket portion is an undercut recess and rotation of the ring after it is in place causes its internal projections or ridges to enter the recesses and lock the ring.

The recesses and their engaging projections may be so shaped that rotation of the ring forces it home on the socket.

The moulded socket portion of a wall plug is usually secured to a base by screws and sometimes such screws serve also to fix both the base and the moulded socket portion to the wall or other support. When the invention is applied to such constructions the tightening of these screws may be caused to have the effect of binding the engaging members of the ring and the socket to prevent rotation in a backward direction, i. e. in a direction which would effect disengagement between them.

In the accompanying drawings which illustrate the socket portion of a plug and socket connection provided with an earthing ring according to this invention, Figure 1 is a side view with a portion of the ring removed, Figure 2 is a bottom plan, and Figure 3 is a side view with the ring in section and partly removed from the block.

In these figures A is the block of moulded insulating material carrying the metal sockets $A^1$ for the plug pins which in themselves form no part of the present invention. The upper part of the block is shown as having recesses $A^2$ to take the heads of holding-down screws B which pass through holes in the block and enter a base or wall C.

The main portion of the block A is circular in cross section and the lower part, which is of somewhat larger diameter, is formed with flats as at $A^3$ (Figure 2). Adjacent to each of these flats is an undercut portion $A^4$ having above it an inclined lip or ridge $A^5$.

The enclosing metal sleeve or earthing ring D is provided with two internal ribs or projections $D^1$ which may for instance be integral with the ring or may be short lengths of wire or rod secured to it.

After the block A has been wired, the earthing ring is slipped over it so that the ribs $D^1$ pass over the flats $A^3$. The ring is then rotated to bring the ribs under the lips or ridges $A^5$, the holding-down screws B being left loose to allow of this being done as shown in Figure 3. The tightening of these screws locks the earthing ring and the block firmly together in the position shown in Figure 1.

The ring may if desired be locked to the block solely by means of a wedging action between the engaging surfaces.

What I claim as my invention and desire to secure by Letters Patent is:

In an electric plug and socket connector, in combination, a base member, an insulating block adapted to rest on said base member and forming the socket portion of the connector, means for securing said block on said base member, a metal sheathing ring independent of said securing means and adapted to be slipped over the exterior of said block, an undercut recess on the exterior of said block forming an inclined lip thereon, and an internal projection on said ring having an inclined face adapted to engage under said inclined lip when the ring is turned relatively to the block, said projection being clamped between the lip and the base member so as to prevent the ring from rotating in the disengaging direction by the tightening of the means for securing the block to the base member.

In testimony whereof I have signed my name to this specification.

HAROLD FREDERIC SECRETAN.